(12) United States Patent
Stampfli et al.

(10) Patent No.: US 7,934,210 B1
(45) Date of Patent: Apr. 26, 2011

(54) SYSTEM AND METHOD FOR UPDATING ONE OR MORE PROGRAMS AND THEIR ENVIRONMENT

(75) Inventors: Tracy Stampfli, San Francisco, CA (US); Rebekah Cunningham, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 828 days.

(21) Appl. No.: 11/090,741

(22) Filed: Mar. 25, 2005

Related U.S. Application Data

(60) Provisional application No. 60/556,721, filed on Mar. 26, 2004, provisional application No. 60/556,595, filed on Mar. 26, 2004, provisional application No. 60/556,966, filed on Mar. 26, 2004.

(51) Int. Cl.
*G06F 9/44* (2006.01)
*G06F 9/445* (2006.01)
*G06F 15/177* (2006.01)

(52) U.S. Cl. .................. 717/168; 717/174; 709/220

(58) Field of Classification Search .................. None
See application file for complete search history.

(56) References Cited

U.S. PATENT DOCUMENTS

| | | | |
|---|---|---|---|
| 5,157,763 A | 10/1992 | Peters et al. | |
| 5,301,268 A | 4/1994 | Takeda | |
| 5,555,416 A * | 9/1996 | Owens et al. | 717/178 |
| 5,606,674 A | 2/1997 | Root | |
| 5,625,809 A | 4/1997 | Dysart et al. | |
| 5,694,563 A | 12/1997 | Belfiore et al. | |
| 5,781,192 A | 7/1998 | Kodimer | |
| 5,784,058 A | 7/1998 | LaStrange et al. | |
| 5,801,693 A | 9/1998 | Bailey | |
| 5,835,777 A * | 11/1998 | Staelin | 717/175 |
| 5,886,699 A | 3/1999 | Belfiore et al. | |
| 5,924,099 A | 7/1999 | Guzak et al. | |
| 5,999,740 A * | 12/1999 | Rowley | 717/173 |
| 6,009,274 A * | 12/1999 | Fletcher et al. | 717/173 |
| 6,028,965 A | 2/2000 | Normile | |
| 6,061,058 A | 5/2000 | Owens et al. | |
| 6,067,582 A * | 5/2000 | Smith et al. | 710/5 |
| 6,125,388 A | 9/2000 | Reisman | |
| 6,216,152 B1 | 4/2001 | Wong et al. | |
| 6,272,493 B1 | 8/2001 | Pasquali | |
| 6,314,565 B1 | 11/2001 | Kenner et al. | |
| 6,321,209 B1 | 11/2001 | Pasquali | |

(Continued)

FOREIGN PATENT DOCUMENTS

WO  WO0043913 A1  7/2000

(Continued)

OTHER PUBLICATIONS

Lambert, Karine, Authorized Officer, European Patent Office, in International Search Report for Application Serial No. PCT/US2008/066184, mailed Nov. 6, 2008, 15 pages, to be published by USPTO.

(Continued)

*Primary Examiner* — Michael J Yigdall
*Assistant Examiner* — Evral Bodden
(74) *Attorney, Agent, or Firm* — Fish & Richardson P.C.

(57) ABSTRACT

A system and method automatically updates one or more programs and some or all of an environment in which the one or more programs run, to latest versions of the programs and the environment, or portion thereof.

27 Claims, 4 Drawing Sheets

U.S. PATENT DOCUMENTS

| | | | |
|---|---|---|---|
| 6,378,128 B1* | 4/2002 | Edelstein et al. | 717/174 |
| 6,418,555 B2 | 7/2002 | Mohammed | |
| 6,434,563 B1 | 8/2002 | Pasquali et al. | |
| 6,535,882 B2 | 3/2003 | Pasquali | |
| 6,539,539 B1* | 3/2003 | Larsen et al. | 717/124 |
| 6,546,554 B1 | 4/2003 | Schmidt et al. | |
| 6,557,054 B2 | 4/2003 | Reisman | |
| 6,606,744 B1 | 8/2003 | Mikurak | |
| 6,636,856 B2 | 10/2003 | Pasquali | |
| 6,651,249 B2 | 11/2003 | Waldin et al. | |
| 6,654,765 B2 | 11/2003 | Wong et al. | |
| 6,658,419 B2 | 12/2003 | Pasquali | |
| 6,687,745 B1 | 2/2004 | Franco et al. | |
| 6,748,591 B1 | 6/2004 | Lewallen | |
| 6,757,365 B1 | 6/2004 | Bogard | |
| 6,785,885 B2 | 8/2004 | Norris et al. | |
| 6,803,929 B2 | 10/2004 | Hinegardner et al. | |
| 6,839,714 B2 | 1/2005 | Wheeler et al. | |
| 6,874,142 B1 | 3/2005 | Ogura | |
| 6,904,569 B1 | 6/2005 | Anderson | |
| 6,944,821 B1 | 9/2005 | Bates et al. | |
| 6,961,907 B1 | 11/2005 | Bailey | |
| 7,080,139 B1 | 7/2006 | Briggs et al. | |
| 7,085,817 B1 | 8/2006 | Tock et al. | |
| 7,127,405 B1 | 10/2006 | Frank et al. | |
| 7,263,545 B2 | 8/2007 | Digate et al. | |
| 7,287,097 B1 | 10/2007 | Friend et al. | |
| 7,293,242 B2 | 11/2007 | Cossey et al. | |
| 7,296,244 B2 | 11/2007 | Martinez et al. | |
| 7,299,259 B2 | 11/2007 | Petrovykh | |
| 7,305,453 B2 | 12/2007 | Awamoto et al. | |
| 7,310,781 B2 | 12/2007 | Chen et al. | |
| 7,337,210 B2 | 2/2008 | Barsness | |
| 7,370,278 B2 | 5/2008 | Malik et al. | |
| 7,383,308 B1 | 6/2008 | Groves et al. | |
| 7,383,356 B2 | 6/2008 | Gargi | |
| 7,386,841 B2 | 6/2008 | Huang et al. | |
| 7,434,048 B1 | 10/2008 | Shapiro et al. | |
| 7,478,336 B2 | 1/2009 | Chen et al. | |
| 7,617,458 B1 | 11/2009 | Wassom et al. | |
| 2001/0034244 A1 | 10/2001 | Calder et al. | |
| 2002/0049633 A1 | 4/2002 | Pasquali | |
| 2002/0055975 A1 | 5/2002 | Petrovykh | |
| 2002/0069264 A1 | 6/2002 | Pasquali | |
| 2002/0080179 A1 | 6/2002 | Okabe et al. | |
| 2002/0103902 A1 | 8/2002 | Nagel et al. | |
| 2003/0050932 A1 | 3/2003 | Pace et al. | |
| 2003/0208491 A1 | 11/2003 | Pasquali | |
| 2004/0093563 A1 | 5/2004 | Pasquali | |
| 2004/0111478 A1 | 6/2004 | Gross et al. | |
| 2004/0143633 A1 | 7/2004 | McCarty | |
| 2004/0205134 A1 | 10/2004 | Digate et al. | |
| 2004/0230967 A1 | 11/2004 | Yuknewicz et al. | |
| 2005/0021652 A1 | 1/2005 | McCormack | |
| 2005/0049960 A1 | 3/2005 | Yeager | |
| 2005/0066019 A1* | 3/2005 | Egan et al. | 709/223 |
| 2005/0086290 A1 | 4/2005 | Joyce et al. | |
| 2005/0086640 A1* | 4/2005 | Kolehmainen et al. | 717/120 |
| 2005/0097061 A1 | 5/2005 | Shapiro et al. | |
| 2005/0172241 A1 | 8/2005 | Daniels et al. | |
| 2005/0198581 A1 | 9/2005 | Soderberg et al. | |
| 2005/0203892 A1 | 9/2005 | Wesley et al. | |
| 2005/0210401 A1 | 9/2005 | Ketola et al. | |
| 2005/0257128 A1 | 11/2005 | Pasquali et al. | |
| 2005/0262521 A1 | 11/2005 | Kesavarapu | |
| 2006/0025091 A1 | 2/2006 | Buford | |
| 2006/0085796 A1 | 4/2006 | Hoerle et al. | |
| 2006/0095524 A1 | 5/2006 | Kay et al. | |
| 2006/0271526 A1 | 11/2006 | Charnock et al. | |

FOREIGN PATENT DOCUMENTS

| | | |
|---|---|---|
| WO | WO0049545 A9 | 3/2002 |

OTHER PUBLICATIONS

Lambert, Karine, Authorized Officer, European Patent Office, in International Search Report for Application Serial No. PCT/US2008/066188, mailed Nov. 6, 2008, 15 pages, to be published by USPTO.

Muller, Nathan J., "Focus on OpenView," Chapters 8, 9 and 10 (Mar. 1995).

Netscape 7.1 Upgrade Guide, 8 pages (2003).

RealPresenter™ Plug-in for use with Microsoft® PowerPoint® 97, User's Guide Version 5.0, Real Networks, Inc., 29 pages (1998).

Sun Microsystems, Inc., Java™ Network Launching Protocol & API Specification (JSR-56) Version 1.5 [Online] May 2001, XP007906066. Retrieved from the Internet: URL: http://cds.sun.com/is-bin/INTERSHOP.enfinity/WFS/CDS-CDS_Developer-Site/en_US/-/USD/VerifyItem-Start/jnlp-1_5-mr-spec.pdf?BundledLineItemUUID=gvVIBe.pDpoAAAEdPR1iMS9Y&OrderID=0Q51Be.pB8IAAAEdMB1iMS9Y&ProductID=fL_ACUFB1v0AAEY2U45AXuV&FileName=/jnlp-1_5-mr-spec.pdf> (Retrieved on Nov. 24, 2008), pp. 1-85.

Sun Microsystems, Inc., "Auto Downloading JREs using Java™ Web Start and Java™ Plug-in" [Online] Feb. 2007, pp. 1-3, XP007906067. Retrieved from the Internet: URL: http://web.archive.org/web/20070207051627/http://java.sun.com/j2se/1.5.0/docs/guide/javaws/developersguide/autod1.03.06.html> (Retrieved on Nov. 28, 2004).

Sun Microsystems, Inc., Packaging JNLP Applications in a Web Archive, Java™ Web Start 1.4.2 [Online] Aug. 2005, pp. 1-11, XP007906068. Retrieved from the Internet: URL: http://web.archive.org/web/20050828081147/http://java.sun.com/j2se/1.4.2/dosc/guide/jws/downloadservletguide.html> (Retrieved on Nov. 24, 2008).

U.S. Appl. No. 11/282,217, filed Nov. 18, 2005, System and Method for Communicating Instant Message Information Between an Instant Messaging Node and One or More Programs, Dura et al.

U.S. Appl. No. 11/090,402, filed Mar. 25, 2005, Communicating Information Over a Network, Lynch et al.

U.S. Appl. No. 11/089,699, filed Mar. 25, 2005, Installing One or More Programs, and at Least a Portion of Their Environment, Lynch et al.

U.S. Appl. No. 11/280,023, filed Nov. 15, 2005, Communicating State and Title Information Between a Browser and a Rich Internet Application with Browser Forward and Back Button Support, Lynch et al.

U.S. Appl. No. 11/280,714, filed Nov. 15, 2005, Communicating State and Title Information Between a Browser and a Rich Internet Application, Lynch.

U.S. Appl. No. 11/282,916, filed Nov. 18, 2005, Communicating Data Among Two or More Programs, Malasky et al.

U.S. Appl. No. 11/282,266, filed Nov. 18, 2005, Providing Notices to Users of a Computer Program in a Flexible Way, Malasky et al.

Kolehmainen et al., U.S. Appl. No. 60/513,050, titled: Systems and Methods for Facilitating Software Development and Communications Efficacy, filed Oct. 21, 2003.

In U.S. Appl. No. 11/282,916, Final Office Action dated Jul. 9, 2009, to be published by United States Patent and Trademark Office, 26 pages.

Corporate Portals Letter, vol. 1, No. 10, Oct. 2000, 3 pages.

In U.S. Appl. No. 11/282,916, filed Nov. 18, 2005, Non-Final Office Action dated Jan. 28, 2009, to be published by the United States Patent and Trademark Office, 15 pages.

In U.S. Appl. No. 11/282,217, filed Nov. 18, 2005. Non-Final Office Action dated Feb. 5, 2009, to be published by the United States Patent and Trademark Office, 16 pages.

In U.S. Appl. No. 11/282,217, Final Office Action dated Aug. 5, 2009, to be published by the USPTO, 19 pages.

In U.S. Appl. No. 11/282,217, Non-Final Office Action dated Jan. 4, 2010, to be published by United States Patent and Trademark Office, 20 pages.

In U.S. Appl. No. 11/090,402, filed Mar. 25, 2005, Non-Final Office Action dated Nov. 19, 2007, to be published by United States Patent and Trademark Office, 9 pages.

In U.S. Appl. No. 11/090,402, Final Office Action, mailed Jul. 22, 2008, to be published by United States Patent and Trademark Office, 18 pages.

In U.S. Appl. No. 11/090,402, Final Office Action, mailed Jan. 9, 2009, to be published by United States Patent and Trademark Office, 18 pages.

In U.S. Appl. No. 11/090,402, Non-Final Office Action dated Aug. 6, 2009, to be published by United States Patent and Trademark Office, 24 pages.

In U.S. Appl. No. 11/089,699, filed Mar. 25, 2005, Non-Final Office Action dated Jun. 25, 2008, to be published by United States Patent and Trademark Office, 122 pages.

In U.S. Appl. No. 11/280,714, filed Nov. 15, 2005, Non-Final Office Action dated Jun. 11, 2009, to be published by United States Patent and Trademark Office, 27 pages.

In U.S. Appl. No. 11/280,714, Final Office Action dated Dec. 24, 2009, to be published by United States Patent and Trademark Office, 34 pages.

Windley, Phillip J., "REST: Representational State Transfer," Chapter 11, Mar. 22, 2005, pp. 237-261.

In U.S. Appl. No. 11/089,699, Non-Final Office Action dated Dec. 15, 2008, to be published by United States Patent and Trademark Office, 8 pages.

In U.S. Appl. No. 11/089,699, Non-Final Office Action dated Jul. 9, 2009, to be published by United States Patent and Trademark Office, 10 pages.

In U.S. Appl. No. 11/090,402, Final Office Action dated Mar. 8, 2010, to be published by the United States Patent and Trademark Office, 34 pages.

U.S. Appl. No. 11/875,764, filed Oct. 19, 2007, in Office Action, mailed Sep. 1, 2010, 7 pages.

* cited by examiner

SYSTEM AND METHOD FOR UPDATING ONE OR MORE PROGRAMS AND THEIR ENVIRONMENT

RELATED APPLICATIONS

This application claims the benefit of U.S. provisional application Ser. No. 60/556,721 entitled, "Method and Apparatus for Communicating Information Over a Network" filed on Mar. 26, 2004 by Kevin Lynch, David Calaprice, Ethan Malasky and Tracy Stampfli; U.S. provisional application Ser. No. 60/556,595 entitled, "Method and Apparatus for Installing One or More Programs and At Least a Portion of Their Environment" filed on Mar. 26, 2004 by Kevin Lynch, Tracy Stampfli, Peter Grandmaison and Rebekah Hash; and U.S. provisional application Ser. No. 60/556,966 entitled, "Method and Apparatus for Updating One or More Programs and Their Environment" filed on Mar. 26, 2004 by Tracy Stampfli and Rebekah Hash, each having the same assignee as this application and each is incorporated herein by reference in its entirety.

This application is related to U.S. application Ser. No. 11/090,402 entitled, "System and Method for Communicating Information Over a Network" filed on Mar. 25, 2005 by Kevin Lynch, David Calaprice, Ethan Malasky and Tracy Stampfli; and application Ser. No. 11/089,699 entitled, "System and Method for Installing One or More Programs and At Least a Portion of Their Environment" filed on Mar. 25, 2005 by Kevin Lynch, Tracy Stampfli, Peter Grandmaison and Rebekah Hash; each having the same assignee as this application and each is incorporated herein by reference in its entirety.

FIELD OF THE INVENTION

The present invention is related to computer software and more specifically to computer software for updating computer programs and at least a portion of the environment in which the computer programs run.

BACKGROUND OF THE INVENTION

Computer programs operate in an environment. For example, the environment of some conventional computer programs is a Pentium-compatible computer system with a minimum memory and the Windows XP or XP pro operating system. Other programs, such as those described in the related applications, may require additional items as the environment in which the program can operate. For example, the programs described in the related applications can make use of an agent manager, application shell manager and console manager, operating under the direction of a master controller, all of which can be supplied as computer software, such as the conventional Central product commercially available from Macromedia, Inc., and both described and available from Macromedia.com. The Central product is therefore the environment for the programs that run under it. As used herein, an "environment" is any required or desired hardware or software element used by an application program to run in its expected mode of operation. For example, the Central product is at least part of the environment in which a Central application program runs.

Not only does a computer program operate in its environment, it may be highly dependent on the environment. Some computer programs are written to take advantage of certain capabilities of the environment, and won't operate properly or optimally without those capabilities.

Computer programs may be updated to allow improvements or bug fixes to be incorporated into the software. Additionally, portions of, or all of, the environment may similarly be updated. If the environment is updated to offer new capabilities, computer programs operating in the environment may need to be updated in order to take advantage of the new capabilities.

However, when a new capability is made available in an environment, many developers of computer programs are reluctant to immediately provide an update of the computer programs to take advantage of the new capabilities because they cannot be sure that many users will upgrade their environments. One reason for this reluctance is the fact that not all users will update the environment immediately, requiring the developer of the program to support both the old and new environments. When a single computer program must accommodate both an older environment and a newer one, the program can become larger and operate more slowly. As a result, the developer may hold off developing for the upgraded environment, diminishing the value to users of obtaining the upgraded environment. This causes users to hold off updating the environment, thereby perpetuating the problem of developers being reluctant to upgrade in a vicious cycle.

In the meantime, the new environment may need accommodate different versions of the same program: one version that has the latest enhancements and others that do not, making the environment potentially larger and slower than it would be if obsolete commands could be removed, such removal being possible when all users of programs that used such commands only in their pre-updated versions had updated the programs. This makes the developer of the environment reluctant to update it, further perpetuating the problems.

Even if the developers were willing to update the programs and their environment, the users might still be unwilling to do so. The update process takes time and can be cumbersome for users, and so many users do not wish to perform such an update frequently. This further discourages developers from supplying them.

What is needed is a system and method that can update both a set of one or more computer programs, and some or all of the environment of those programs without requiring significant input or effort from the user.

SUMMARY OF INVENTION

A system and method updates some or all of the environment in which one or more programs operates, and updates the programs as well. The process is handled automatically, freeing the user from having to implement it and thereby nearly ensuring its performance. Because the environment can be updated rapidly after updates are made available, developers can develop for the updated environment, assured that the users of the programs developed for that environment will have the latest version installed within a brief period of time. Because the programs can be updated rapidly as well, the developer of the environment can be assured that all users of a program will rapidly have the same version of that program. Because the environment and the programs are updated by the same system and method, the system and method can limit the installation of updates of programs to those systems that have an updated environment, ensuring compatibility without requiring backwards compatibility of the program, and ultimately, the environment.

DETAILED DESCRIPTION OF A PREFERRED EMBODIMENT

Figure 1:
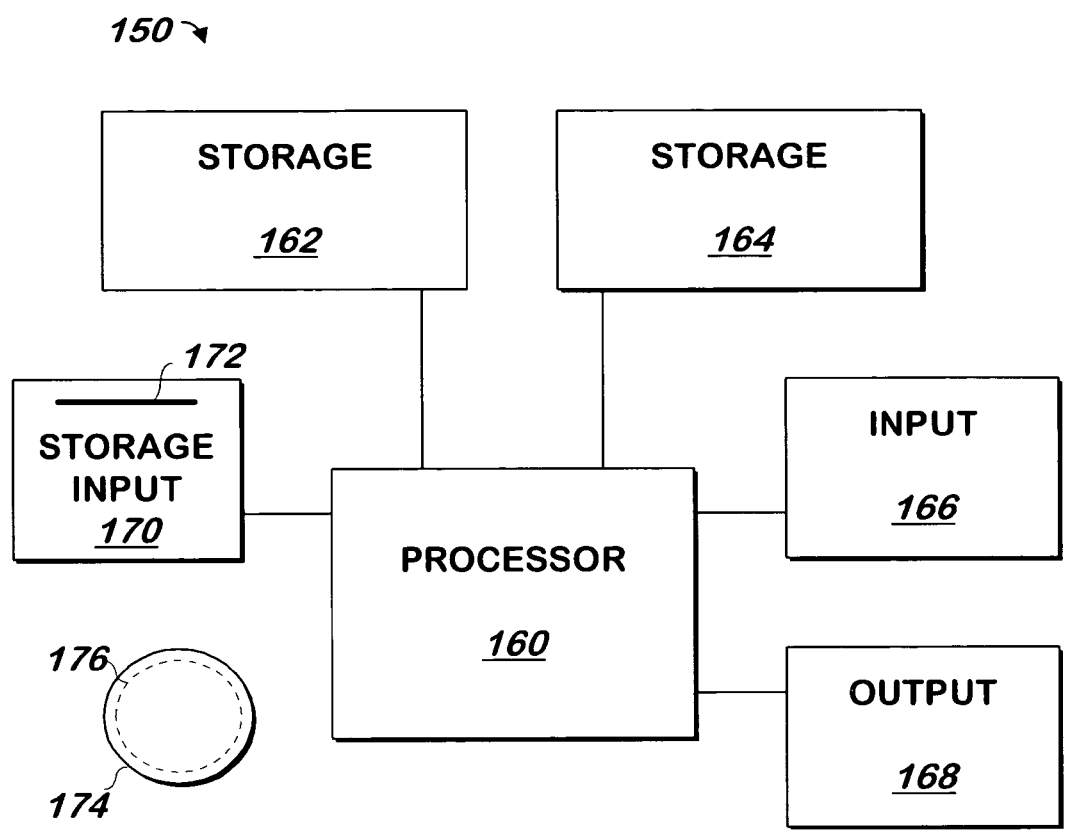
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

Figure 2:
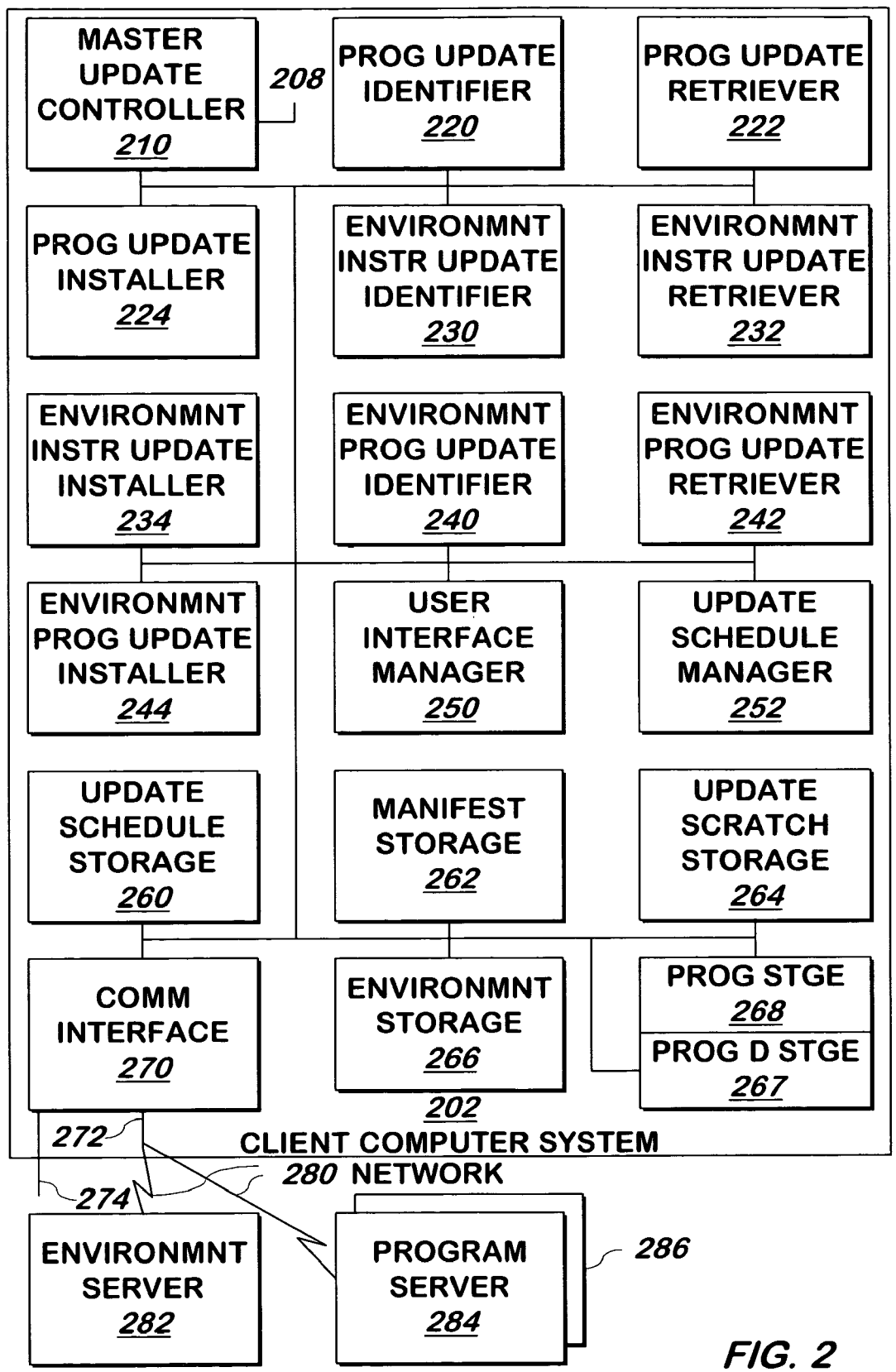
FIG. 2 is a block schematic diagram of a system for updating one or more programs and/or at least a portion of an environment in which the one or more programs operate according to one embodiment of the present invention.

Referring now to FIG. 2, a system for updating one or more programs and at least a portion of the environment in which the one or more programs run is shown according to one embodiment of the present invention. System 200 consists of client computer system 202 such as is described above and containing elements 210-274 described below, network 282, which may be any conventional network, such as a conventional Ethernet network, the Internet or both, and servers 282-286, which are conventional web servers or file servers.

In one embodiment, all communication into or out of client computer system 202 is made via input/output 272 of communication interface 270 which is coupled to network 280. Communication interface 210 is a conventional communication interface that supports Ethernet, TCP/IP and/or other conventional communication protocols. Communication interface 270 also contains input/output 274 coupled to conventional input/output devices (not shown) such as a conventional keyboard, monitor, and mouse, and communication interface 270 contains a suitable interface thereto.

Master update controller 210 initiates the update process for the environment and the programs as described herein. In one embodiment, master update controller 210 initiates the update process when the environment is started. The master controller of the environment, described in the related applications, is stored in environment storage 266 and when started, it signals master update controller 210 via input 208 (which may also be an output), which then initiates the update process described herein. The update process may be initiated at a time other than when the environment is started: it may be initiated when a program is started, after a program loads and starts to run, after a program is terminated or just before the environment is terminated. In one embodiment, the update process may be initiated upon receipt of a command to do so by the user, provided via a user interface provided by the application shell manager movie file, and that movie file signals the application shell manager, which signals the master controller, all described in the related application Ser. No. 11/090,402. In one embodiment, master update controller 210 as well as some or all of elements 220-260 may be a part of the master controller described in the related applications, that directs the operation of the environment.

Update of Program Files

When signaled, update controller 210 signals program update identifier 220 to identify a program that runs in the environment and that is scheduled to be updated. In one embodiment, the environment is the conventional Central product commercially available from Macromedia.com, and a program is a set of any of an agent, an application and one or more pods that work together as described in the related application. Central products and programs are described in the related applications and at the Web site of Macromedia.com, which is hereby incorporated by reference in its entirety.

Program update identifier 220 scans the manifests in manifest storage 262 (or program update identifier 220 may scan other files or filenames in certain locations in program storage 268 prestored by program update identifier 220 or use other conventional program detection techniques, such as reviewing one or more registries or databases) to identify a program installed on client computer system 202. In one embodiment, each program has its own manifest that is downloaded at or about the time the program or any update thereto is downloaded. The manifest describes information about the program as described herein and at macromedia.com/devnet/central/ on the World Wide Web. When it locates such a program, program update identifier 220 scans update storage 260 for an entry that corresponds to the located program (e.g. the entry may contain the some or all of the name of the subdirectory in which the program files reside or a name of such a program). In an entry does not exist for that program, the program is new, and so program update identifier 220 builds an entry corresponding to the name or other identifier of the program and adds an update period (described below) to the current date and time (or another date and time near the current date and time) retrieved from an operating system (not shown) to produce a next update time for the program, which program update identifier 220 stores in the entry for that program in update storage 260. Program update identifier 220 then again starts the process described herein to locate and process another program or determines that there are no more programs to be located.

In one embodiment, an update period is received from the user by user interface manager 250, which provides a user interface to the user and receives the update period from the user. A default update period of one week may be initially supplied, to be changed by the user if desired. User interface manager 250 stores the update period into update schedule storage 260, for use as described herein.

In one embodiment, an update period may be separately specified by the developer of each program in the manifest received for any program. In such embodiment, when a next update date and time is being calculated for a program as described herein, the entity calculating it looks into the manifest for that program to identify whether an update period has been specified for the program, and if so, that update period is used to calculate the next update date and time. If not, the update period stored in update schedule storage 260 is used to calculate the next update date and time for the program.

If an entry exists for the located program in update storage, program update identifier 220 compares the next update date and time in the entry for that program with the current date and time, which program update identifier 220 retrieves from operating system (not shown). If the next update time for the program is later than the current date and time, program update identifier 220 then does not update that program. Instead, it again begins the process described herein to locate and potentially update another program or determines that there are no more programs to be located. Otherwise, program update identifier 220 provides the name of the program to master update controller 210.

When it receives the name of a program to be updated from program update identifier 220, master update controller 210 provides the name of the program to program update retriever 222. Program update retriever 222 uses the program name to retrieve the location of the update to the program from manifest storage. In one embodiment, each program has a manifest that is retrieved from the server from which the program was obtained at the time the program was installed as described herein and also in the related applications. The manifest is stored into manifest storage 262 and contains the name of the program and the one or more server addresses on program server 284 or 286 at which updates (or at least the manifest for the update) may be obtained. This allows a developer to change the location of the next update (or to change at least the location of the manifest for the next update) by specifying it in the manifest of the initial installation or any subsequent update.

Program servers 284 and 286 are each conventional file servers that store and provide updates for programs. In one embodiment, a program may consist of one or more files and program server 284 contains all such files for a program. The update for another program may be stored on a different program server such as program server 286 or it may be stored on program server 284, and there may be any number of programs and program servers 284, 286. In one embodiment, servers 282, 284, 286 are operated by different commercial entities. For example, server 282 may be operated by or for the developer of the environment and servers 284, 286 may be operated by or for the different developers of different programs. There may be any number of servers 282-284, not just those shown.

In one embodiment, an update must be located in a single Internet domain and the domain must be the same domain from which the program was initially retrieved or at least be the domain indicated on the manifest for that program stored in manifest storage 262. Program update retriever 222 enforces some or all of these restrictions when it retrieves the update.

In one embodiment, the location of the update is, or contains, the URL of a manifest stored on program server 264, and program update retriever 222 retrieves that manifest from program server 264 that describes the update in the same manner that the original manifest described the initial installation of the program: it contains a list of files and one or more addresses corresponding to the location on program server 264 of each of the files in the manifest. The manifest also contains the version number of the latest version of the program and may contain other information as well. The manifest may be in the form of an XML file or another type of one or more files. Program update retriever 222 retrieves and stores the manifest into update scratch storage 264 and compares the version number with the version number for that program that is already installed in program storage 268 by checking the version number of the installed program in the manifest in manifest storage, which has a form similar to that of the manifest retrieved. If the version numbers match or the version number in the manifest in update scratch storage 264 has a version number below that specified by the manifest for the program in manifest storage 262, program update retriever 222 discards the manifest in update scratch storage 264 and does not retrieve the update. Program update retriever signals master update controller 210 with the name of the program. As noted below, master update controller 210 will then signal update schedule manager 252 with the name or other identifier of the program. Update schedule manager 252 adds the update period (either the one for the program in the program's manifest in manifest storage 262, or if none is specified, the update period stored in update schedule storage 260) to the current date and time (or one near the current date and time), or adds it to the next update date and time for the program stored in update schedule storage 260 and stores the result as the next update time for the program in update schedule storage 260 and signals master update controller 210. Master update controller 210, signals program update identifier 220, which attempts to find another program and performs the techniques described herein to determine whether to update the program and optionally, to update it, as set forth herein.

If the version numbers do not match exactly (e.g. version 7.02 and version 7.03 do not match exactly) and the version specified in the manifest in update scratch storage 264 is higher than the version in the manifest in manifest storage 262 for the corresponding program (7.03 is higher than 7.02), program update retriever 222 continues as will now be described.

Program update retriever 222 retrieves the update from program server 284 and stores it into update scratch storage 264. When the one or more files in the update have been completely received, program update retriever 222 signals program update installer 224 with the name of the program.

When signaled, program update installer 224 deletes some or all of the program having the name it receives from program storage 268 and moves or copies the update for that program from update scratch storage 264 into program storage 268. In one embodiment, program update installer 224 deletes the program using the manifest in manifest storage 262 corresponding to the installed program to identify the files corresponding to the program, and in another embodiment, such files are stored in a known location, such as a subdirectory in program storage 268 having a name identical or similar to that of the program, and program update installer 224 may delete some or all of the files in that subdirectory or other location. Program update installer 224 may then locate the manifest for that program in update scratch storage 264 (or such files may be stored in a subdirectory in update scratch storage 264 corresponding to the name of the program and program update installer 224 uses their location to identify them) to move or copy the program files from update scratch storage 264 into program storage 268, and to move or copy the manifest into manifest storage 262 and then to delete those files from update scratch storage 264. If the former manifest was not deleted, program update installer 224 may delete it before moving or copying the new manifest into manifest storage 262.

In one embodiment, a separate storage area exists for program data, program data storage 267. Program data storage provides persistent storage for each program, such as by subdividing it into subdirectories for each program. In one embodiment, program update installer 224 does not delete the files stored in a program's assigned portion of program data storage 267 when it installs the update, although in another embodiment, program update installer 224 deletes the files stored in the portion of program data storage assigned to the program according to instructions in the manifest retrieved for the update. The instructions may instruct program update installer 224 to delete some or all of such files, to replace them with certain files retrieved as part of the update (in which case program update installer 224 does not place such files into program storage 268) or to modify specified ones of them (or all of them) according to certain instruction files that describe how any such file is to be modified, and program update installer 224 complies with the instructions.

When program update installer 224 has completed installing the program files, program update installer 224 signals program update retriever 222, which notifies master update controller 210 with the name of the program.

When notified, master update controller 210 signals update schedule manager 252 with the name of the program that either has just been updated as described above, or determined that no update was available as described above.

Update schedule manager 252 retrieves either the current date and time from operating system (or one near in time to the current date and time), or the next update date and time for that program from update schedule storage 260, retrieves the update period (either the one for the program in the program's manifest in manifest storage 262, or if none is specified, the update period stored in update schedule storage 260), adds it to the current (or other) date and time or the next update time, and stores the result as a new next update time for that program in update schedule storage. Update schedule manager 252 then signals master update controller 210, which signals program update identifier 220 to identify the next program for update, or determine, and indicate to master update controller 210, that there are no more programs to be updated, both as described above. Program update identifier 220 then repeats the process described above.

When program update identifier 220 indicates to master update controller 210 that there are no more programs to be updated, master update controller 210 determines whether it is time to check for an update for the environment files in environment storage 266. The environment files are any one or more files that are used to provide the environment, such as those files that may operate the boot loader, master controller, agent manager, application shell manager or console manager in the related application.

To determine if it is time to check for an update to the environment files, master update controller 210 retrieves the next update date and time for the environment from update schedule storage 260. If no such time is stored there, master update controller 210 retrieves the current date and time from the operating system, adds the update period to it, and stores the result as the next update date and time for the environment into update schedule storage 260. Otherwise, master update controller 210 compares the next update date and time it retrieved from update schedule storage 260 with the current date and time master update controller 210 retrieves from the operating system (or with another date and time near the current date and time). If the current (or other) date and time is after the next update date and time for the environment, master update controller 210 signals environment instruction update identifier 230. Otherwise, master update controller 210 terminates its operation until it is next signaled as described above.

In one embodiment, there may be two next update times: a first one for the environment instruction files and a second one for the environment program files and they may each be different. Master update controller 210 compares the first one with the current date and time, and if the first one is earlier than the current date and time, signals environment instruction update identifier 230. If not, but if the second one is earlier than the current date and time, master update controller 210 signals environment program update identifier 240 as described below. If neither one is earlier than the current date and time, master update controller 210 terminates its operation until it is signaled again.

Update of Environment Instruction Files

As described in the related applications, the environment may consist of one set of files, referred to as "instruction files" containing instructions or other information describing the operation of the environment, and another set of files, referred to as "program files" that are part of a system to interpret those instructions. The environment instruction files are or include Flash movies in the .swf format in one embodiment, and the environment program files are or include Flash movie players, modified to work as a part of the Central operating system, and descriptions of all of these are found at the Web site of macromedia.com and are hereby incorporated by reference in their entirety. In one embodiment, the update of each set (e.g. the set of program files and the set of instruction files) of environment files is handled differently, although in other embodiments, the update of all environment files may be handled using the techniques described for either set of files. In one embodiment, the program files may be any set of logically related files in which the update of such one or more of such files require installation in a manner other than just blind replacement, and the instruction files are a logically related set of files in which all files may be blindly replaced at any time to update them, as described in more detail below.

When signaled, environment instruction update identifier 230 determines whether an update is available for the environment instruction files. In one embodiment, a manifest exists for the environment (such manifest may be in one file or in two files: one for the instruction files and another for the program files, or the environment manifest may be contained in one or more of the files that make up the environment), and environment instruction update identifier 230 uses the manifest to determine whether an update exists for the environment instruction file in the same manner that the manifest is used to determine whether an update exists for a program as described above. In such embodiment, the manifest may specify version numbers for each of the two sets of environment files or a single version may be used for all environment files.

Environment instruction update identifier 230 compares the version number for the environment instruction files with the version number of the environment instruction files stored on a manifest for the latest version of the environment on environment server 282. In one embodiment, the address of the manifest on environment server 282 is stored in the manifest in environment storage 266, which environment instruction update identifier 230 uses to retrieve the manifest from environment server 282 and stores it into update scratch storage 264. In another embodiment, the address of the manifest on environment server 282 is contained or coded into environment instruction update identifier 230.

If the version numbers are different (or if the one retrieved has a later version), environment instruction update identifier 230 signals environment instruction update retriever 232 to retrieve the updated environment instruction files from environment server 282. Environment instruction update retriever 232 retrieves the updated environment instruction files from environment server 282, either using a predefined location stored in environment instruction update retriever 232 or using a location stored in the manifest retrieved as described above and stored into update scratch storage 264, and stores the environment instruction files into update scratch storage 264, for example using a subdirectory with a predefined name. When all such environment instruction files have been so retrieved, environment instruction update retriever 232 signals environment instruction update installer 234.

In another embodiment, each environment instruction file may have a version specified in the manifest for the environment, which environment instruction update identifier 230 reads from environment storage 266. The manifest specifies the location of a manifest on environment server 282, and that manifest describes the version of each of the most recent environment instruction files. Environment instruction update identifier 230 compares the versions of the file on each manifest to identify whether an update exists for the file, and signals environment instruction update retriever 232 to retrieve files for which an update exists, and environment instruction update retriever 232 complies.

In still another embodiment, the manifest for the environment specifies a location on manifest server 282 in which all environment instruction files are stored, and environment instruction update identifier 230 identifies if an update is available for a file by comparing one or more characteristics of the file stored in environment storage 266 with the same characteristics of the corresponding file stored in manifest server 282. The one or more characteristics may include a modification date, file size or any other one or more characteristics. In one embodiment, a manifest is not used and the locations of the environment files on manifest server 282 are stored internally by environment instruction update identifier 230.

If environment instruction update identifier 230 identifies a file for which an update is available, it provides the file name to environment instruction update retriever 232 which retrieves the file and stores it into update scratch storage 264, and signals environment instruction update identifier 230. When all updates for the environment instruction files have been retrieved, environment instruction update identifier 230 signals environment instruction update installer 234 to install the files.

Environment instruction update installer 234 installs the environment instruction files from update scratch storage 264 into environment storage 266 in a manner that deletes some or all of the former environment instruction files (e.g. by moving them, copying them into environment storage 266 and deleting them from update scratch storage 264, etc.). In one embodiment, environment instruction update installer 234 performs other conventional file installation activities, such as decompressing the files or registering them to an entity or a registry.

When environment instruction update installer 234 has completed installing the environment instruction files, environment instruction update installer 234 signals master update controller 210.

Update of Environment Program Files

When signaled, master update controller 210 signals environment program update identifier 240 (or signals it 240 only if the next update date and time for environment program files is before the current date and time or other similar time as described above). Environment program update identifier 240 identifies whether updates are available to the environment program files in a manner similar or identical to any of the manners described above with reference to environment instruction update identifier 230. If a manifest is used, a different manifest or a different portion of the same manifest as was described above identifies information for the environment program files or versions as was described above for environment instruction files or versions, or the same version may be used for each set of environment files. If necessary, environment program update identifier 240 retrieves any required manifest in the same or similar manner as environment update identifier 230 described above.

If updates to the environment program files are not available, environment program update identifier 240 signals master update controller 210. If updates to the environment program files are available, environment program update identifier 240 signals environment program update retriever 242, which retrieves into update scratch storage 264 the environment program files from environment server 282 in the any of the same manners described above that environment instruction update retriever 232 could use to retrieve the environment instruction files, and then signals environment program update retriever 242 signals environment program update installer 244.

Environment program update installer 244 installs the environment program files from the update that are stored in update scratch storage 264 in place of the environment program that is currently there, and may be running. In one embodiment, to install the program can require that certain files are installed before other files, and that ultimately, the running environment get shut down before certain files are ultimately installed, any or all of which may be specified by the manifest retrieved, and environment program update installer 244 performs the installation in accordance with such instructions. In this case, environment program update installer 244 may signal user interface manager 250 to prompt the user to shut the environment program down before completing the installation of the environment program files. If the user indicates that the program may be shut down, user interface manager 250 signals environment program update installer 244, which requests the operating system to shut down the environment, completes the installation, and then instructs the operating system to start the environment. Environment program update installer 244 then signals master update controller 210.

Master update controller 210 then signals update schedule manager 252 to update the next update date and time for the environment by adding the update period to either the existing next schedule date and time or the current date and time (or another nearby date and time), and storing the result as the next update date and time (or, if different next update dates and times are used for the environment instruction files and the environment program files, master update controller 210 signals schedule update manager 252 to update, in a similar manner, either or both of such next update date and times that were before the current date and time or other similar time).

An update period may be specified in the manifest for the environment, or for the environment instruction files and the environment program files, and if such a period or periods is or are specified, schedule update manager 252 uses it or them as the update period, and if not, uses the update period in update period storage 260 when calculating a next update date and time. The description above employs a single update period for the environment, but different update periods for the environment instruction files and environment program files may be specified by one or more environment manifests, as described in FIG. 3.

In a manner similar to that described above for the programs, the location to be used for retrieval of one or more manifests for the environment may be specified by the one or more manifests for the environment currently stored in environment storage 266. Because new one or more environment manifests are downloaded during the update process, the new one or more manifests may be used to change the location from which any subsequent manifests may be retrieved.

The above description performed the update of the one or more programs and then performed the update of the environment in which the programs were run, first using the environment instruction files and then using the environment program files. However, in another embodiment, this ordering could be switched using any permutation. Any ordering is sufficient, or sufficient in one embodiment, as long as the performance of one update or set of updates is performed substantially immediately after the performance of the other update or set of updates, or within a few minutes thereof.

In still another embodiment, the update of a program has an additional criteria: that the environment have a particular version. In such embodiment, program update identifier 220 retrieves a minimum required environment version from the manifest it retrieves that corresponds to the latest available version of the program it has identified as described above, and checks the version identifier against the version of the environment stored in the manifest for the environment in environment storage 266. If the version of the environment is not greater than or equal to the minimum required environment version of the program, program update identifier 220 does not provide the name of the program to program update retriever 222 and attempts to find another program as described above.

In one embodiment, the environment is not updated unless all of the programs installed contain a minimum program version that is known to be compatible with the latest version of the environment. In such embodiment, the update to the manifest corresponding to the environment contains the name and minimum compatible versions of all programs with which programs having a lower version are known not to be compatible with the new version of the environment. Environment instruction update identifier 230, environment program update identifier 240, or both, check the manifests of the installed programs, such manifests being stored in manifest storage 262, to ensure that all installed programs referred to in the manifest have at least the version specified in the environment manifest (or each environment manifest, if two such manifests are used). If not, environment instruction update identifier 230, environment program update identifier 240, or both, will not install either the environment instruction files, environment program files or both.

In the case where a program or some or all of the environment is not updated for version incompatibility as described above, program update identifier 220, environment instruction update identifier 230, or environment program update identifier 230 may signal update schedule manager 252 to reschedule its respective update, either as described above in a manner similar to that used when the update occurs, or by providing the name of the interfering program in the case of the environment update identifiers 230, 240, or signaling the existence of the incompatibility in the case of program update identifier and providing an identifier of the program having the incompatibility, and update schedule manager 252 reschedules the update of the environment (or portion thereof) to occur immediately after, or some time after, the next scheduled update for the latest-scheduled program or programs causing the incompatibility with the environment update, or reschedules the update of the program to be performed immediately after, or some time after, the next scheduled update of the environment. In one embodiment, before such rescheduling of the update is performed, the next scheduled update of the program or environment causing the rescheduling may be moved closer to the present time, or an attempt to update it may be made immediately, so as to reduce the time the incompatibility is present.

Storage elements 260-268 may be conventional memory or disk storage for use as described above.

Figure 3A:
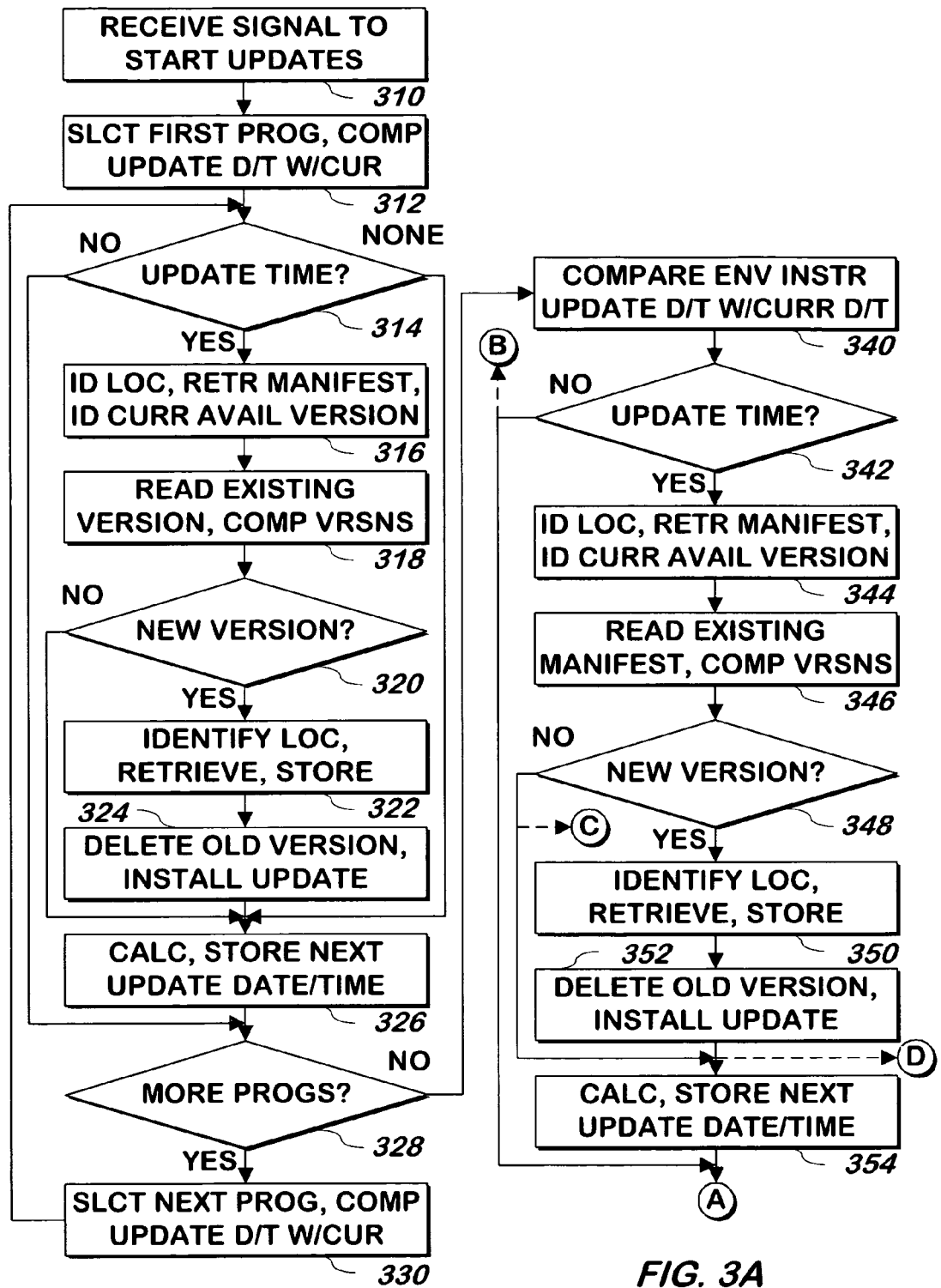
FIG. 3, consisting of FIGS. 3A and 3B is a flowchart illustrating a method of updating one or more programs and/or at least a portion of an environment in which the one or more programs operate according to one embodiment of the present invention.
Figures 3, 3B:
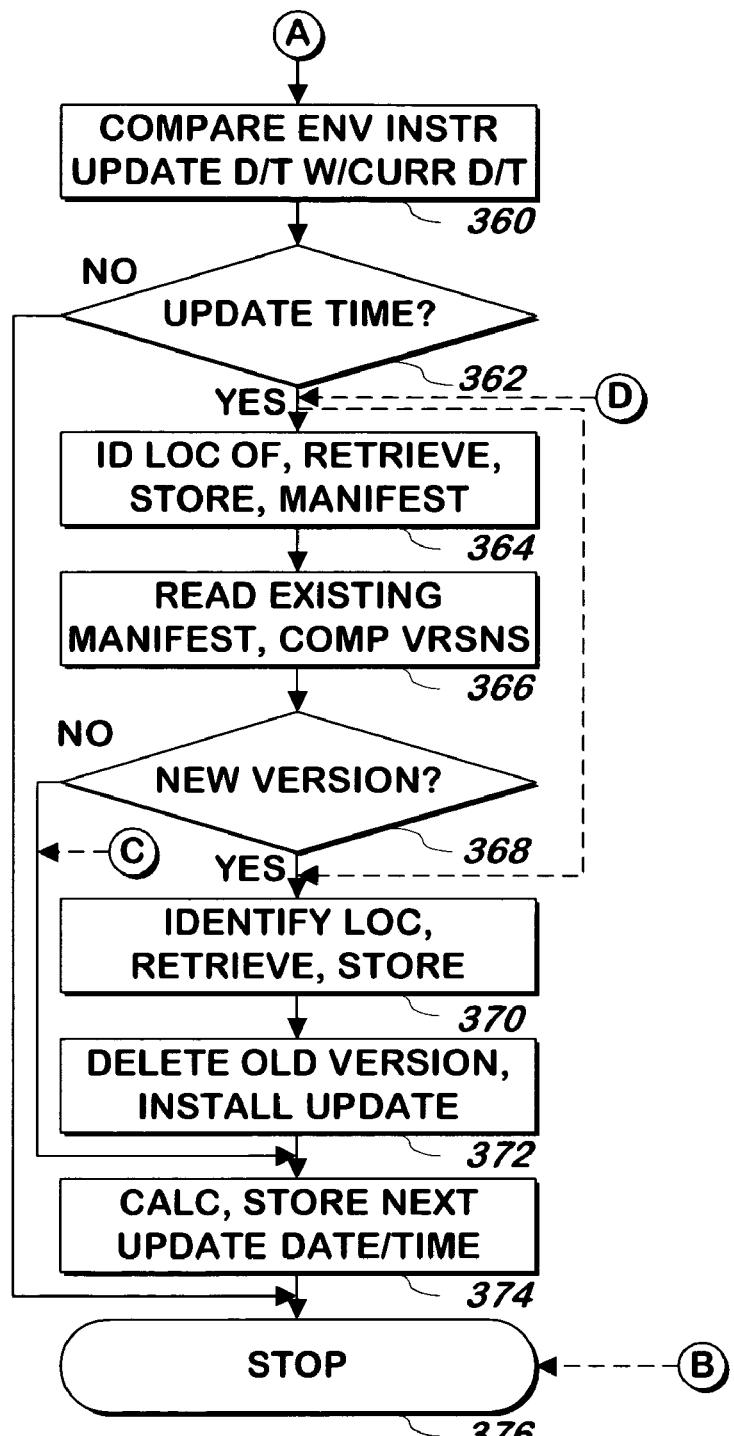

Referring now to FIG. 3, consisting of FIGS. 3A and 3B, a method of updating one or more programs and/or at least a portion of an environment in which the one or more programs operate is shown according to one embodiment of the present invention. A signal to start the update process is received, for example, in response to the environment being started, a program being started, or either of these having run or either of these being terminated or a command received from the user as described above 310. A first one of the one or more programs installed to, or otherwise capable of being, run in the environment is selected and the next update date and time for the program is compared with the current date and time 312 or another similar date and time, such as a date and time close to the current time.

If the current date and time is before the next update date and time for the selected program 314, the method continues at step 328. If none is specified, the method may continue at step 326 (although a next update date and time may be specified for programs as part of the installation process for the first version of the program installed). Otherwise 314, the latest available version of the program is identified 316, such as by identifying the location of a manifest on a server over a network, retrieving the manifest and parsing the version from it. The version of the currently installed program selected is identified, such as by parsing a manifest corresponding to the currently installed program selected, and the version identifiers are compared 318.

If the version identifiers indicate that a version later than the installed version is not available 320, the method continues at step 326. If the version identifiers indicate that a version later than the installed version is available 320, the location of the latest version is identified, and the files are retrieved over a network and stored 322, such as by using the manifest retrieved in step 316, and the new version is installed, for example, by deleting some or all of the installed files corresponding to the selected program and installing the most recently received files for the selected program, for example by any or all of copying them, renaming them, decompressing them or registering them 324 and the method continues at step 326. As noted above, program data files may be retained in step 324, or deleted, replaced or modified according to instructions in the manifest for the update and optionally additional instruction files. Step 324 may include replacing the existing manifest for the program with the manifest retrieved in step 316, there by allowing changes to the location of the next update, and the update period (calculated in step 326) to be made.

At step 326, the next update date and time for the selected program is identified and stored associated with the selected program as described above. If there are no more programs to be selected 328, the method continues at step 340. Otherwise 328, a program unselected since step 310 was performed is selected, and the next update date and time is compared with the current date and time (or a time close to it) 330 and the method continues at step 314.

At step 340, a next update date and time for the environment instruction files is compared with the current date and time or a date time near to it. If the current date and time (or a date and time near the current date and time) is before the next update date and time for the environment instruction files 342, the method continues at step 360 of FIG. 3B (although in another embodiment, in which there is a single update date and time for the environment, the method terminates at step 376 shown on FIG. 3B, via the "B" connectors in the Figure). Otherwise 342, the latest available version of the environment instruction files is identified 344, such as by identifying the location of a manifest on a server over a network, retrieving the manifest and parsing the version from it. The version of the currently installed environment instruction files is identified, such as by parsing a manifest corresponding to the environment instruction files, and the version identifiers are compared 346.

If the version identifiers indicate that a version later than the installed version of the environment instruction files is not available 348, the method continues at step 354 in one embodiment, or step 360 of FIG. 3B in another embodiment shown by connector "D" in the Figure. If the version identifiers indicate that a version later than the installed version is available 348, the location of the latest version is identified 350, such as by using the manifest retrieved in step 344, and the new version is installed, for example, by deleting the installed environment instruction files and installing the most recently received environment instruction files, for example by any or all of copying them, renaming them, decompressing them or registering them 352. The next update time for the environment instruction, files is calculated and stored 354 as described above. The method continues at step 360, illustrated in FIG. 3B. Step 364 may follow step 352 if there is a single next update date and time for all environment files as shown by connectors "D" in the Figure.

At step 360, a next update date and time for the environment program files is compared with the current date and time or a date time near to it. If the current date and time is before the next update date and time for the environment program files 362, the method continues at step 376. Otherwise 362, the latest available version of the environment program files is identified 364, such as by identifying the location of a manifest on a server reachable via a network, retrieving the manifest and parsing the version from it. (Steps 360 and 362 may be omitted in the embodiment in which a single next update time is used for all environment files, as shown by the dashed line in the Figure.)

The version of the currently installed environment program files is identified, such as by parsing a manifest corresponding to the environment program files, and the version identifiers are compared 366.

If the version identifiers indicate that a version later than the installed version is available 368, the location of the latest version is identified 370, such as by using the manifest retrieved in step 364 and the environment program files corresponding to the new version are retrieved and stored as described above, and the new version is installed as described above 372. The next update time for the environment program files (or all environment files) is calculated and stored 374 as described above. The method then terminates 376 to start again at step 310 at some future time.

In one embodiment, a single version identifier is used for both the environment instruction files and the environment program files. In such embodiment, step 374 follows the "no" branch of step 348 as indicated by the "C" connector in the Figure, and some or all of steps 364-368 may be omitted, in addition to steps 360 and 362 described above.

What is claimed is:

1. A method of updating multiple programs that operate in an environment, comprising:
   responsive to a signal:
   checking for available updates for the multiple programs, and
   responsive to at least one updated version of said multiple programs being available, installing the at least one updated version;
   for the environment, responsive to the signal:
   checking to see if an updated version of the environment is available,
   responsive to the updated version of the environment being available, checking to see if the updated version of the environment is compatible with the multiple programs including the at least one updated version of said multiple programs,
   responsive to the updated version of the environment being compatible with the multiple programs, installing the updated version of the environment;
   responsive to the updated version of the environment not being compatible with one or more of the multiple programs:
   changing a next scheduled update of a program of said multiple programs that caused the incompatibility to occur sooner, and
   scheduling a repeating of at least the checking to see if the updated version of the environment is compatible with the multiple programs, to occur after the changed next scheduled update of the program of said multiple programs that caused the incompatibility; and
   wherein installing the updated version of the environment occurs after the scheduled repeating determines the environment is compatible with the multiple programs, including the at least one updated version of said multiple programs.

2. The method of claim 1, wherein the updated version of the environment is installed after all updated versions of the multiple programs are installed.

3. The method of claim 1, wherein at least one of the checking step and the installing step for the multiple programs is responsive to at least one date.

4. The method of claim 3, wherein the at least one date comprises at least one date for each of the multiple programs.

5. The method of claim 4, wherein the at least one date for each of the multiple programs is responsive to:
   a date on which said program was last updated or installed; and
   an update period received with the program or update thereto.

6. The method of claim 1, wherein at least one of checking step and the installing step for the environment is responsive to at least one date.

7. The method of claim 1, wherein the installing the at least one updated version step comprises downloading the at least one updated version from at least one server.

8. The method of claim 7, wherein the at least one server comprises a multiple servers that are each operated by different first commercial entities.

9. The method of claim 8 wherein the installing the updated version of the environment comprises downloading said updated version of the environment from a server operated by a second commercial entity, different from the first commercial entities.

10. A system for updating multiple programs that operate in an environment, comprising:
    a storage device operable to store software instructions;
    a processor operable to interact with the storage device, to retrieve and execute software instructions embodying modules comprising:
    a program update retriever having an input for receiving a signal, the program update retriever for, responsive to the signal received at the input, checking via an input/output for available updates for the multiple programs, and for retrieving via the program update retriever input/output at least one updated version of the multiple programs responsive to said at least one updated version being available and providing said at least one updated version at an output; and
    a program update installer having an input coupled to the program update retriever output for receiving said at least one updated version and installing said at least one updated version;
    an environment update retriever having an input for receiving the signal, the environment update retriever for, responsive to the signal received at the environment update retriever input:
    checking via an input/output to see if an updated version of the environment is available,
    responsive to the updated version of the environment being available, checking to see if the updated version of the environment is compatible with the multiple programs, including the at least one updated version of said multiple programs,
    retrieving via the environment update retriever input/output said updated version of the environment responsive to said updated version of the environment being compatible, and
    providing said updated version of the environment at an output; and
    an environment update installer having an input coupled to the environment update retriever output for receiving said updated version of the environment and installing said updated version of the environment
    wherein the environment update retriever is further configured to:
    responsive to the updated version of the environment not being compatible with one or more of the multiple programs:
    change a next scheduled update of a program of said multiple programs that caused the incompatibility to occur sooner, and
    scheduling a repeat of at least the checking to see if the updated version of the environment is compatible with the multiple programs operation, to occur after the changed next scheduled update of a program of said multiple programs that caused the incompatibility; and
    wherein the retrieving the updated version of the environment operation and the providing the updated version of the environment at an output operation occur after the scheduled repeating operation determines the environment is compatible with the multiple programs, including the at least one updated version of said multiple programs.

11. A computer program product comprising a computer useable medium having computer readable program code embodied therein for updating multiple programs that operate in an environment, the computer program product comprising computer readable program code devices configured to cause a computer system to:
    responsive to a signal:
    check for available updates for the multiple programs, and
    responsive to at least one updated version of said multiple programs being available, install the at least one updated version;
    for the environment, responsive to the signal:
    check to see if an updated version of the environment is available,
    responsive to the updated version of the environment being available, check to see if the updated version of the environment is compatible with the multiple programs, including the at least one updated version of said multiple programs,
    responsive to the update version of the environment being compatible with the multiple programs, install the updated version of the environment;
    responsive to the updated version of the environment not being compatible with one or more of the multiple programs:
    change a next scheduled update of a program of said multiple programs that caused the incompatibility to occur sooner, and
    scheduling a repeating of at least the checking to see if the updated version of the environment is compatible with the multiple programs, to occur after the changed next scheduled update of the program of said multiple programs that caused the incompatibility; and
    wherein installing the updated version of the environment occurs after the scheduled repeating determines the environment is compatible with the multiple programs, including the at least one updated version of said multiple programs.

12. The computer program product of claim 11, wherein the updated version of the environment is installed after all updated versions of the multiple programs are installed.

13. The computer program product of claim 11, wherein at least one of the computer readable program code devices configured to cause the computer system to check for available updates for the multiple programs and the computer readable program code devices configured to cause the computer system to install the at least one updated version is responsive to at least one date.

14. The computer program product of claim 13, wherein the at least one date comprises at least one date for each of the multiple programs.

15. The computer program product of claim 14, wherein the at least one date for each of the multiple programs is responsive to:
    a date on which said program was last updated or installed; and
    an update period received with the program or update thereto.

16. The computer program product of claim 11, wherein at least one of the computer readable program code devices configured to cause the computer system to check for the environment and the computer readable program code devices configured to cause the computer system to install for the environment is responsive to at least one date.

17. The computer program product of claim 11, wherein the computer readable program code devices configured to cause the computer system to install the at least one updated version comprise computer readable program code devices configured to cause the computer system to download the at least one updated version from at least one server.

18. The computer program product of claim 17, wherein the at least one server comprises multiple servers that are each operated by different first commercial entities.

19. The computer program product of claim 18 wherein the computer readable program code devices configured to cause the computer system to install the updated version of the environment comprise computer readable program code devices configured to cause the computer system to download said updated version of the environment from a server operated by a second commercial entity, different from the first commercial entities.

20. The system of claim 10, wherein the updated version of the environment is installed after all updated versions of the multiple programs are installed.

21. The system of claim 10, wherein at least one of the checking operation and the installing operation for the multiple programs is responsive to at least one date.

22. The system of claim 21, wherein the at least one date comprises at least one date for each of the multiple programs.

23. The system of claim 22, wherein the at least one date for each of the multiple programs is responsive to:
   a date on which said program was last updated or installed; and
   an update period received with the program or update thereto.

24. The system of claim 10, wherein at least one of the checking operation and the installing operation for the environment is responsive to at least one date.

25. The system of claim 10, wherein the installing the at least one updated version of the multiple programs operation comprises downloading the at least on updated version program from at least one server.

26. The system of claim 10, wherein the at least one server comprises multiple servers operated by different first commercial entities.

27. The system of claim 26 wherein the installing the updated version of the environment comprises downloading said updated version of the environment from a server operated by a second commercial entity, different from the first commercial entities.

* * * * *

UNITED STATES PATENT AND TRADEMARK OFFICE
CERTIFICATE OF CORRECTION

| | | |
|---|---|---|
| PATENT NO. | : 7,934,210 B1 | Page 1 of 1 |
| APPLICATION NO. | : 11/090741 | |
| DATED | : April 26, 2011 | |
| INVENTOR(S) | : Stampfli et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 837 days.

Signed and Sealed this
Twenty-sixth Day of July, 2011

David J. Kappos
*Director of the United States Patent and Trademark Office*